United States Patent
Thornberry et al.

(10) Patent No.: US 7,833,335 B2
(45) Date of Patent: Nov. 16, 2010

(54) INK-JET INK SETS

(75) Inventors: Matthew Thornberry, Corvallis, OR (US); Hiang P. Lauw, Corvallis, OR (US); Raymond Adamic, Corvallis, OR (US); James P. Shields, Philomath, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 789 days.

(21) Appl. No.: 11/786,706

(22) Filed: Apr. 12, 2007

(65) Prior Publication Data

US 2008/0252681 A1    Oct. 16, 2008

(51) Int. Cl.
*C09D 11/02* (2006.01)
*B41J 2/01* (2006.01)
*B32B 3/10* (2006.01)

(52) U.S. Cl. .............. 106/31.27; 106/31.48; 106/31.5; 106/31.51; 106/31.52; 347/100; 428/195.1

(58) Field of Classification Search ............. 106/31.27, 106/31.52, 31.5, 31.48, 31.51; 347/100; 428/195.1

See application file for complete search history.

(56) References Cited

U.S. PATENT DOCUMENTS

| | | | |
|---|---|---|---|
| 5,203,912 A | 4/1993 | Greenwood | |
| 5,554,261 A | 9/1996 | Nilz et al. | |
| 5,622,549 A | 4/1997 | Yui et al. | |
| 5,746,818 A | 5/1998 | Yatake | |
| 6,004,389 A * | 12/1999 | Yatake | 106/31.52 |
| 6,350,507 B1 | 2/2002 | Iwamoto et al. | |
| 6,720,367 B2 * | 4/2004 | Taniguchi et al. | 523/160 |
| 7,005,003 B2 | 2/2006 | Mott et al. | |
| 7,264,662 B2 * | 9/2007 | Dodge et al. | 106/31.48 |

* cited by examiner

*Primary Examiner*—Helene Klemanski

(57) ABSTRACT

Ink-jet sets, printer systems, methods of printing, and printing materials are disclosed.

35 Claims, 4 Drawing Sheets

Formula I

Formula II

Formula III

Formula IV

Formula V

Formula VI

Formula VII

Formula VIII

Formula IX

Formula X

INK-JET INK SETS

BACKGROUND

The use of inkjet printing systems in offices and homes has grown dramatically in recent years. The growth can be attributed to drastic reductions in the cost of inkjet printers and substantial improvements in print resolution and overall print quality. While the print quality has drastically improved, research and development efforts continue toward improving the water durability of inkjet prints because this property still falls short of the prints produced by some other printing techniques. A continued demand in inkjet printing has resulted in the need to produce high quality prints with good permanence and water durability, while maintaining a reasonable cost.

In inkjet printing, the inkjet image is formed on a print medium when a precise pattern of dots is ejected from a drop-generating device known as a printhead. The typical inkjet printhead has an array of precisely formed nozzles located on a nozzle plate and attached to an inkjet printhead array. The inkjet printhead array incorporates an array of firing chambers that receive liquid ink, which includes pigment-based inks and/or dye-based inks dissolved or dispersed in a liquid vehicle, through fluid communication with one or more ink reservoirs. Each chamber has a thin-film resistor, known as a firing resistor, located opposite the nozzle so ink can collect between the firing resistor and the nozzle. Upon energizing of a particular firing resistor, a droplet of ink is expelled through the nozzle toward the print medium to produce the image.

SUMMARY

Briefly described, embodiments of this disclosure include inkjet ink sets, printer systems, methods of printing, and printing materials. One exemplary ink-jet ink set, among others, includes: a first ink and a second ink, wherein the first ink and the second ink are different dye colors, wherein each of the first ink and the second ink include at least one dye selected from a magenta dye, a yellow dye, and a black dye, and wherein the dye is a sulfonated non-metalized azo dye with a $SO_3H$ molecular weight percent of from about 10 to 27%.

An exemplary printer system, among others, includes: a dispensing system including a substrate and at least one printhead, wherein the substrate includes a multivalent salt associated with the substrate, wherein multivalent salt is selected from Group II metals (alkaline earth metals), Group III metals (lanthanides), and multivalent transition metals, wherein the printhead includes at least one of an ink-jet set, wherein the ink-jet set includes a first ink and a second ink: a first ink and a second ink, wherein the first ink and the second ink are different dye colors, wherein each of the first ink and the second ink include at least one dye selected from a magenta dye, a yellow dye, and a black dye, and wherein the dye is a sulfonated non-metalized azo dye with a $SO_3H$ molecular weight percent of from about 10 to 27%.

An exemplary printing material, among others, includes: a substrate that includes a multivalent salt associated with the substrate, wherein multivalent salt is selected from Group II metals (alkaline earth metals), Group III metals (lanthanides), and multivalent transition metals; and a first ink and a second ink, wherein the first ink and the second ink are different dye colors, wherein each of the first ink and the second ink include at least one dye selected from a magenta dye, a yellow dye, and a black dye, and wherein the dye is a sulfonated non-metalized azo dye with a $SO_3H$ molecular weight percent of from about 10 to 27%, wherein the first ink and the second ink are disposed on the substrate.

An exemplary method of printing, among others, includes: providing a substrate that includes a multivalent salt associated with the substrate, wherein multivalent salt is selected from Group II metals (alkaline earth metals), Group III metals (lanthanides), and multivalent transition metals; providing a first ink and a second ink, wherein the first ink and the second ink are different dye colors, wherein each of the first ink and the second ink include at least one dye selected from a magenta dye, a yellow dye, and a black dye, and wherein the dye is a sulfonated non-metalized azo dye with a $SO_3H$ molecular weight percent of from about 10 to 27%; and disposing the first ink and the second ink on the substrate.

BRIEF DESCRIPTION OF THE DRAWINGS

Many aspects of this disclosure can be better understood with reference to the following drawings. The components in the drawings are not necessarily to scale. Moreover, in the drawings, like reference numerals designate corresponding parts throughout the several views.

DETAILED DESCRIPTION

Ink-jet ink sets, printer systems including ink-jet sets, methods of printing, and printing material are described. Embodiments of the present disclosure include ink-jet sets including at least two inks, where each ink includes one or more sulfonated non-metalized azo dyes with a $SO_3H$ molecular weight percentage of about 10 to 27% for the sulfonic acid form of the dye. It is understood that the ink may contain the sulfonic acid and sulfonate forms of a dye where counterions such as lithium, sodium, potassium, and/or ammonium may be present. The ink-jet sets provide enhanced waterfastness on an ink-jet printing media. The inkjet media includes a paper substrate and a multivalent salt (e.g., salt of Ca) associated with the paper substrate, and, optionally, an additive. Although not intending to be bound by theory, the relatively low $SO_3H$ molecular weight percent of the sulfonated non-metalized azo dyes improve waterfastness by decreasing the solubility of the dye and its complexes with multivalent salts (for example, calcium chloride, $CaCl_2$) contained within the printing medium.

Figure 1:
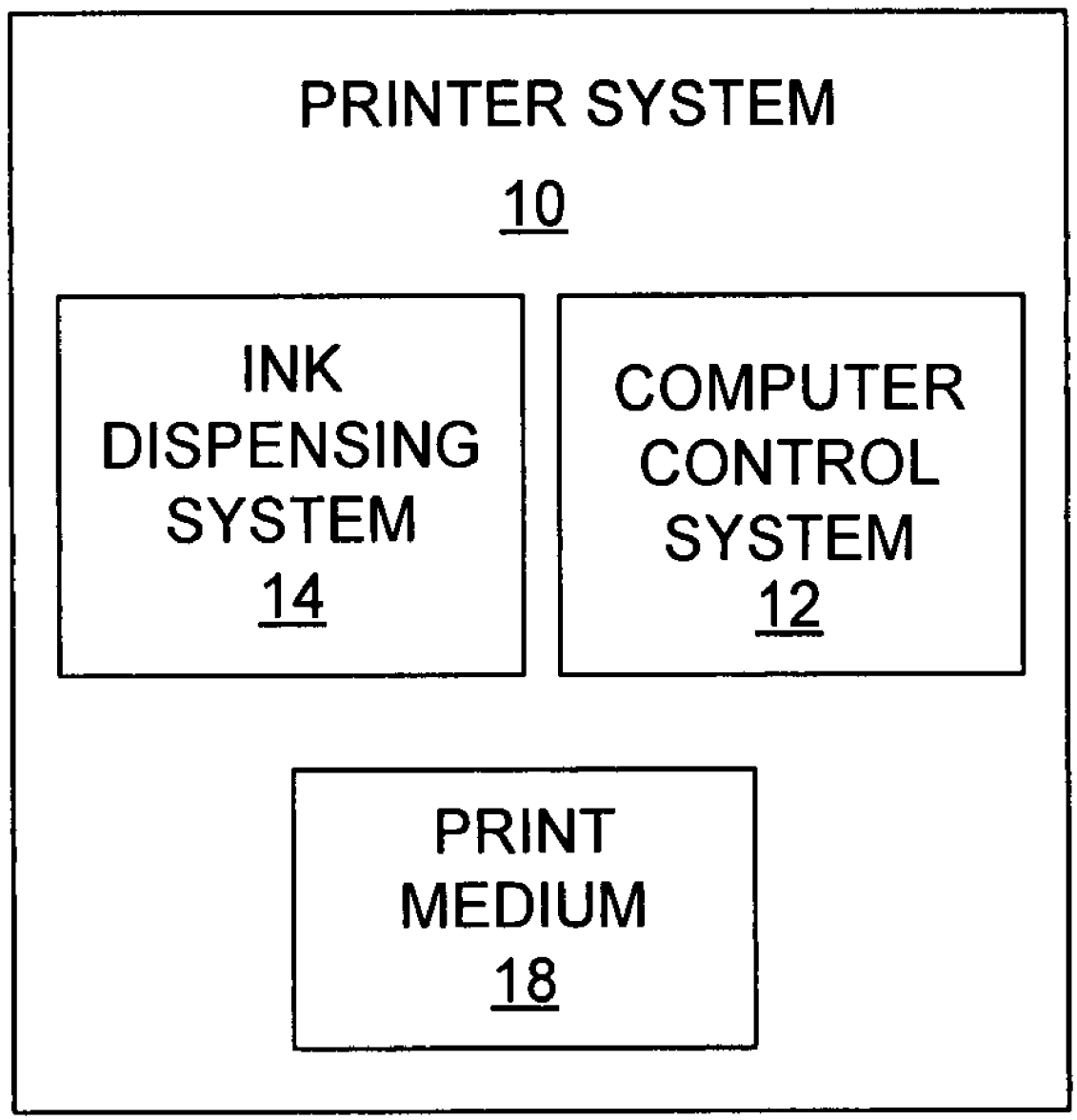
FIG. 1 illustrates an embodiment of a printer system.
Figures 2A, 2B, 2C, 2D, 2E:
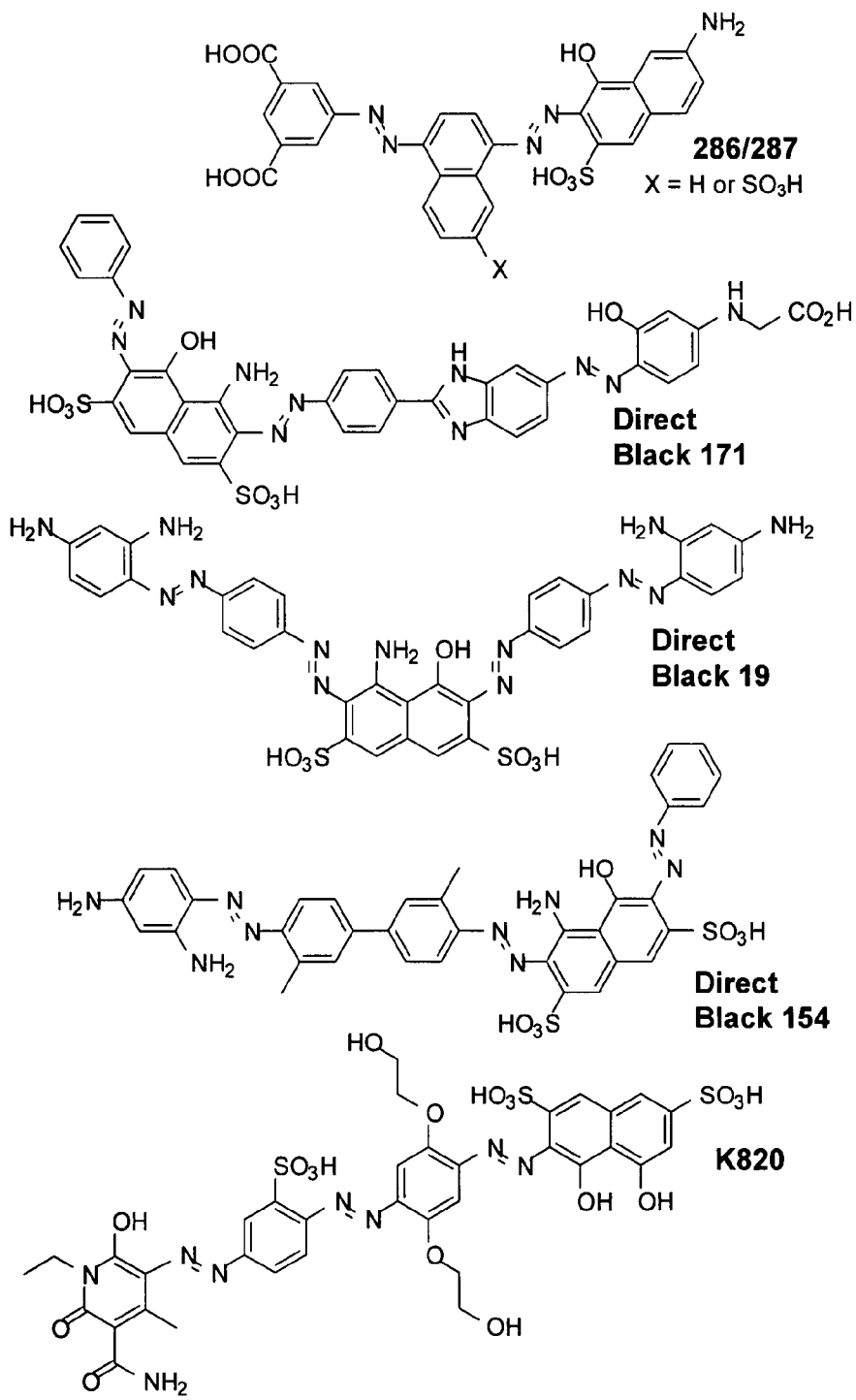
FIGS. 2A-2E illustrate embodiments of black dye compounds having formula I, II, III, IV, and V.

FIG. 1 illustrates a block diagram of a representative printer system 10 that includes a computer control system 12, an ink dispensing system 14, and a print medium 18. The computer control system 12 includes a process control system that is operative to control the ink dispensing system 14. In particular, the computer control system 12 instructs and controls the ink dispensing system 14 to print characters, symbols, photos, etc. onto the print medium 18.

The ink dispensing system 14 includes, but is not limited to, an ink-jet set, ink-jet technologies, and coating technologies, which dispense the dyes of the ink-jet set onto the print medium 18. Ink-jet technology, such as drop-on-demand and continuous flow ink-jet technologies, can be used to dispense the dyes of the ink-jet set. The ink dispensing system 14 can include at least one ink-jet printhead system (e.g., thermal ink-jet printhead and/or a piezo ink-jet print head) operative to dispense (e.g., jet) the dyes through one or more of a plurality of nozzles in a printhead. The term "plurality" as used herein refers to both one or more, and a multitude. The printhead system incorporates an array of firing chambers that receive the dye dissolved or dispersed in a liquid vehicle, which are in fluid communication with one or more dye reservoirs.

The terms "substrate", "print media", "print medium", or "ink-jet media" can include paper substrates include, but is not limited to, woody, synthetic, recycled, or fabric papers. In addition, "print media", "print medium", or "ink-jet media" include a multivalent salt associated with the paper substrate. The metallic salts that can be used include, but are not limited to, Group II metals (alkaline earth metals), Group III metals (lanthanides), and multivalent transition metals. In particular, the metallic cations that can be produced using these salts include, but are not limited to, calcium, magnesium, copper, nickel, zinc, barium, iron, aluminum, chromium, or the like. The anionic species of the salt can be chloride, acetate, benzoate, nitrate, sulfate, sulfite, and toluene sulfonate, or the like. In one embodiment, calcium chloride is a preferred multivalent metal salt that can be used in accordance with embodiments of the present disclosure. In an embodiment, the "print media", "print medium", or "ink-jet media" includes one or more additives such as, but not limited to, a pigment, a binder, starch, an optical brightener, a dye, a lubricant, a surfactant, a Theological modifiers, a crosslinker, a defoamer, and a dispersing agent. Embodiments of the "print media", "print medium", or "ink-jet media" are also described in U.S. Patent Application 20060228499, which is incorporated herein by reference. Once the substrate or print media has been printed upon (e.g., ink has been disposed onto the substrate of print media) the substrate is termed a "printing material".

As mentioned above, the ink-jet ink set includes, but is not limited to, two or more inks, where each ink includes one or more sulfonated non-metalized azo dyes with a $SO_3H$ molecular weight percentage of about 10 to 27% for the sulfonic acid form of the dye. In an embodiment, the ink-jet set includes, but is not limited to, a first ink, a second ink, and a third ink, where each ink is a different color. The colorants in each of the first ink, the second ink, and the third ink are selected from a magenta dye, a yellow dye, and a black dye. In an embodiment, the colorant can include a cyan dye. Each dye is a sulfonated non-metalized azo dye with a $SO_3H$ molecular weight percent of from about 10 to 27%, about 15 to 27%, or about 18 to 27%.

Figure 3A:
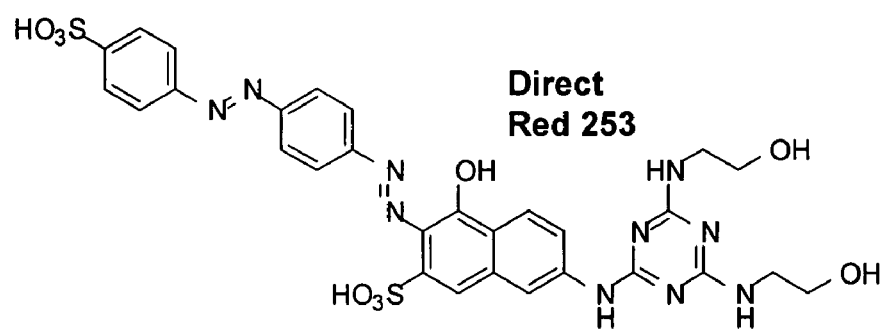
FIGS. 3A-3B illustrate embodiments of magenta dye compounds having formula VI and VII.
Figure 3B:
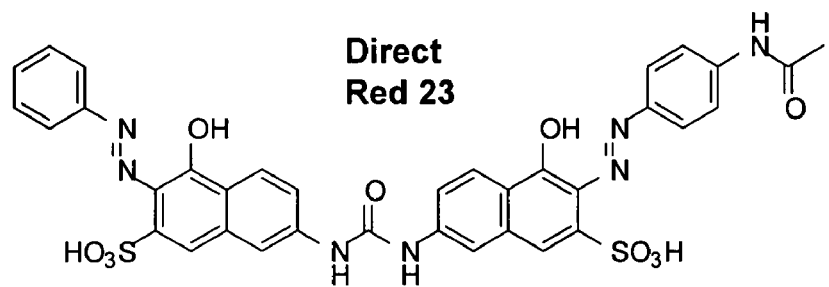
Figure 4A:
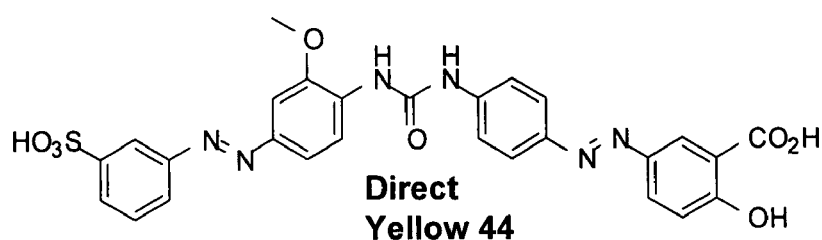
FIGS. 4A-4C illustrate embodiments of yellow dye compounds having formula VIII, X, XI.
Figure 4B:
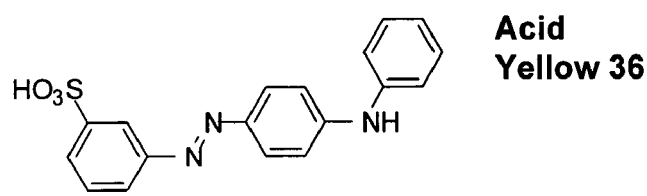
Figure 4C:
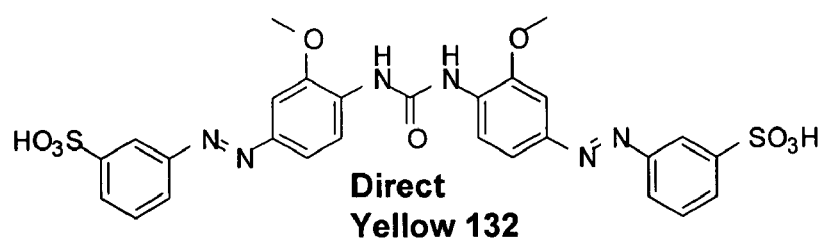

The black dye can include, but is not limited to, compounds having formula I (where X=H or $SO_3H$), formula II (Direct Black 171), formula III (Direct Black 19), formula IV (Direct Black 154), and formula V, as shown in FIGS. 2A-2E. The magenta dye can include, but is not limited to, compounds having VI (Direct Red 253) and VII (Direct Red 23), as shown in FIGS. 3A-3B. The yellow dye can include, but is not limited to, compounds having formula VIII (Direct Yellow 44), IX (Acid Yellow 36), and X (Direct Yellow 132), as shown in FIGS. 4A-4C. Two other waterfast, commercially available dyes with unknown structures are PRO-JET Fast Magenta 2 (Direct Violet 107) and PRO-JET Fast Yellow 2 (Direct Yellow 173) from FujiFilm Imaging & Colorants.

The ink-jet set can include other waterfast inks (e.g., dye-based inks and pigment-based inks). In particular, the waterfast ink can include, but is not limited to, waterfast cyan dyes (e.g., Direct Blue 307 from FujiFilm Imaging & Colorants). In an embodiment, the ink-jet set can include an ink that includes two or more of: a magenta dye, a yellow dye, a black dye, a waterfast cyan dye. The combination of the waterfast magenta dye, the waterfast yellow dye, the waterfast black dye, and the waterfast cyan dyes can be used to produce primary, secondary and neutral color inks.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or 35 10%, or more of the numerical value(s) being modified. In addition, the phrase "about 'x' to 'y'" includes "about 'x' to about 'y'".

Many variations and modifications may be made to the above-described embodiments. All such modifications and variations are intended to be included herein within the scope of this disclosure and protected by the following claims.

EXAMPLE 1

Inks were made using an ink vehicle like that shown below (or another vehicle known in the art). An ink absorbance of 0.28 AU at 5000 fold ink dilution was targeted. This generally yielded inks with dye-loadings of about 1-7 weight percent. All inks were passed through a 0.2 micron filter during pen fill.

TABLE 1

| Ink Components | Weight % |
| --- | --- |
| Hydroxyethyl-2-pyrrolidinone | 6.5 |
| 1,5 pentanediol | 2.00 |
| Trimethylolpropane | 9.00 |
| Tergitol 15S7 | 2.00 |
| 2-(N-Morpholino)ethanesulfonic acid sodium salt | 0.20 |
| pH (adj with conc HNO3) | 6.5 |

For each ink, a set of four horizontal bars measuring 1.5 by 0.5 cm with 0.5 cm spacing between bars are printed on the target print medium (for example, HP Multipurpose Paper with ColorLok). All prints are allowed to dry for at least 30 minutes. The print is held at a 45 degree angle while 100 microliters of deionized water are dripped over the set of four bars. The print is then allowed to dry for at least 30 minutes after which the color change (ΔE) of the printed bars before and after dripping are measured using a spectrophotometer such as a GretagMacBeth SpectroEye. The maximum ΔE is reported in the Table 2.

TABLE 2

| Dye | ΔE | Acid MW | # SO3H | # CO2H | % SO3H | % CO2H |
| --- | --- | --- | --- | --- | --- | --- |
| Formula I | 1.4 | 625.58 | 1.5 | 2.0 | 19.4 | 14.4 |
| Formula V | 2.2 | 950.89 | 3.0 | 0.0 | 25.6 | 0.0 |
| Direct Red 23 | 1.0 | 769.76 | 2.0 | 0.0 | 21.1 | 0.0 |
| Direct Red 253 | 4.9 | 724.73 | 2.0 | 0.0 | 22.4 | 0.0 |
| Acid Yellow 36 | 5.1 | 353.4 | 1.0 | 0.0 | 22.9 | 0.0 |
| Direct Yellow 44 | 6.7 | 590.57 | 1.0 | 1.0 | 13.7 | 7.6 |
| Direct Yellow 132 | 5.0 | 640.65 | 2.0 | 0.0 | 25.3 | 0.0 |
| Direct Black 154 | 2.3 | 765.82 | 2.0 | 0.0 | 21.2 | 0.0 |
| Direct Black 171 | 1.0 | 836.81 | 2.0 | 1.0 | 19.4 | 5.4 |
| Direct Black 19 | 2.2 | 795.81 | 2.0 | 0.0 | 20.4 | 0.0 |

At least the following is claimed:

1. An ink-jet ink set, comprising:

a first ink and a second ink, wherein the first ink and the second ink are different dye colors, wherein each of the first ink and the second ink include at least a first respective sulfonated non-metalized azo dye with a $SO_3H$ molecular weight percent of from about 10 to 27%, wherein said first dye is capable of complexing with a multivalent salt associated with a paper substrate when said inks are deposited on a print medium containing said paper substrate with associated multivalent salt, said first and second inks having enhanced waterfastness when disposed on said print medium, compared to a print medium without said multivalent salt.

2. The ink-jet ink set of claim 1, wherein the first dye is a black dye selected from the group consisting of:

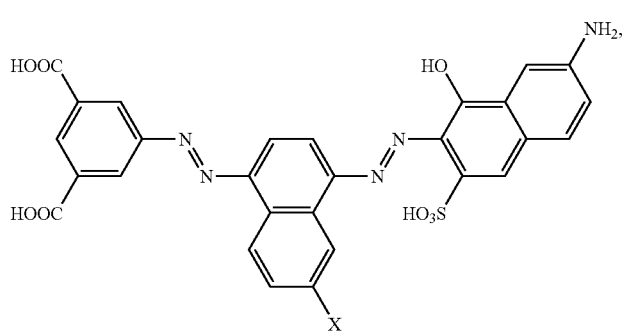

Formula I

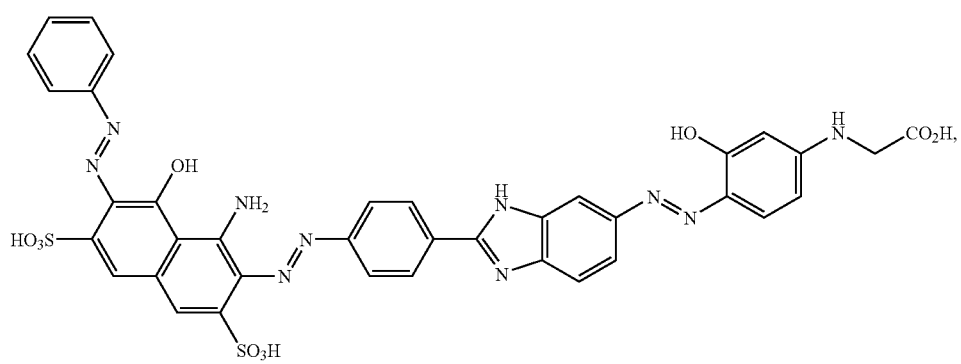

Formula II

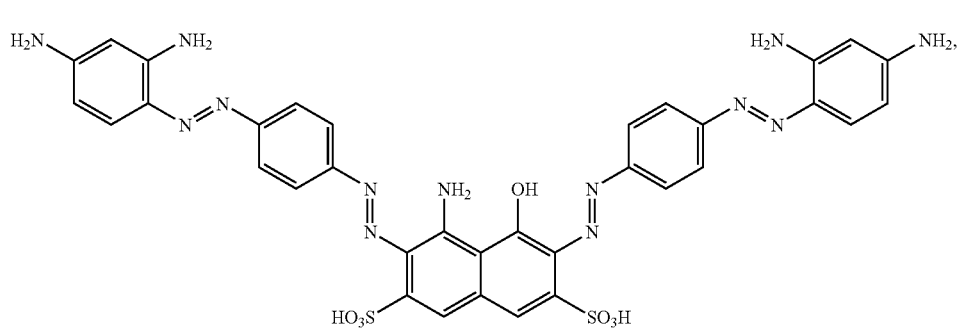

Formula III

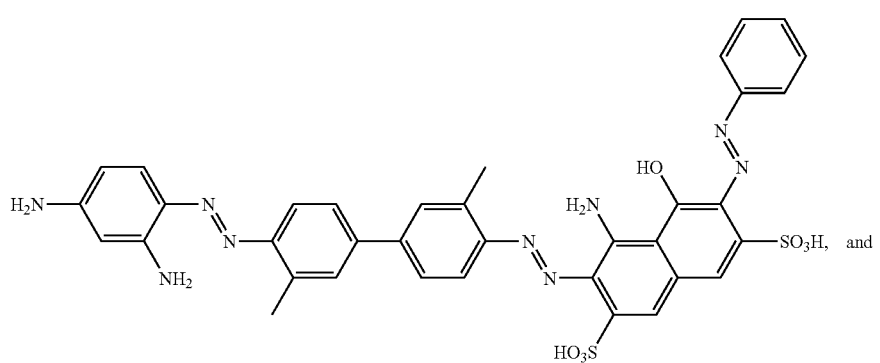

Formula IV

-continued
Formula V
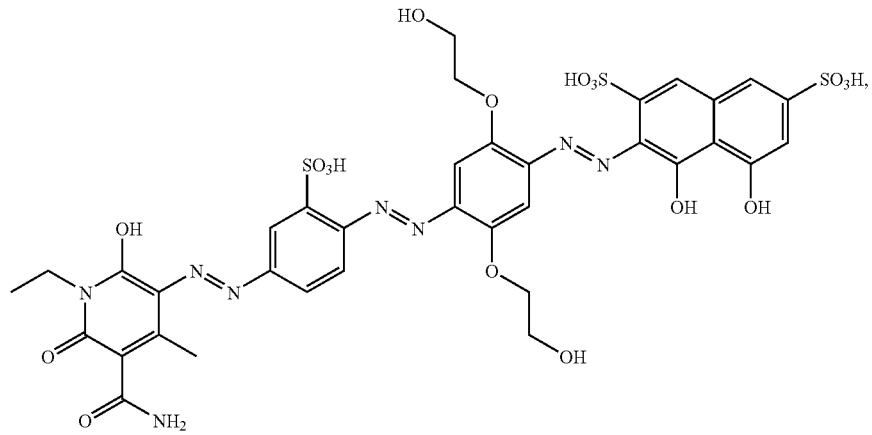
wherein X is H or So₃H.
3. The ink-jet ink set of claim 1, wherein the first dye is a magenta dye selected from the group consisting of:
Formula VI
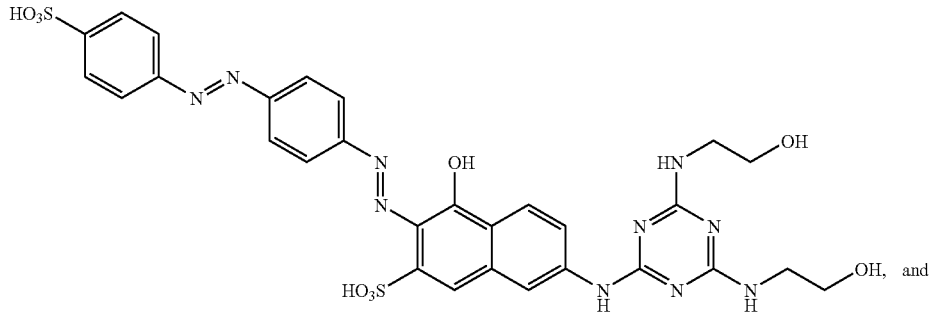
and
Formula VII
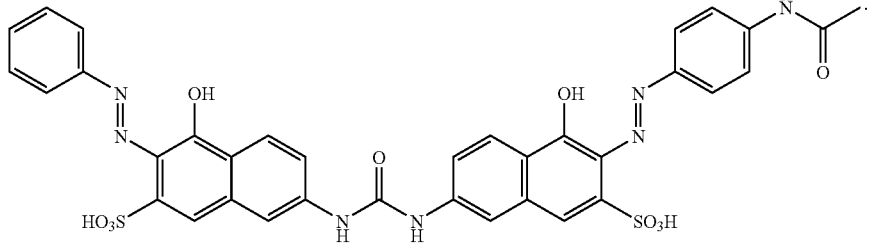
4. The ink-jet ink set of claim 1, wherein the first dye is a yellow dye selected from the group consisting of:
Formula VIII
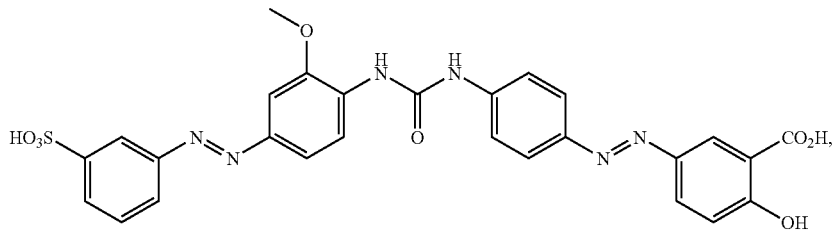

-continued

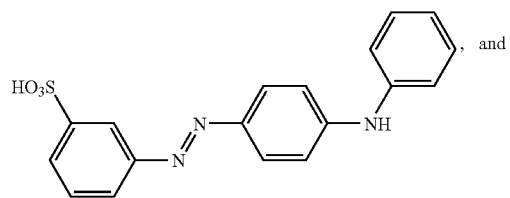, and

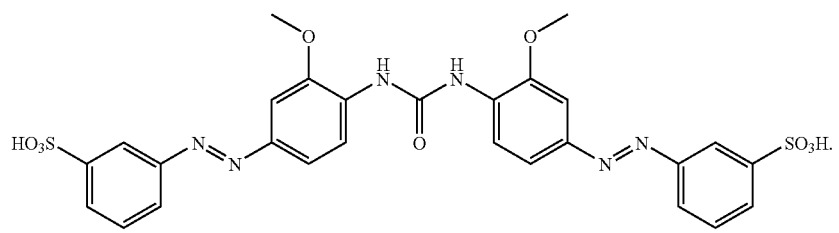

Formula IX

Formula X

5. The ink-jet ink set of claim 1, wherein at least one said ink further comprises a respective second sulfonated non-metalized azo dye with a SO$_3$H molecular weight percent of from 10 to 27%.

6. The ink-jet ink set of claim 5, wherein the first dye is a magenta dye, and the second dye is a yellow dye or a black dye.

7. The ink-jet ink set of claim 6, wherein the second dye is a black dye selected from the group consisting of:

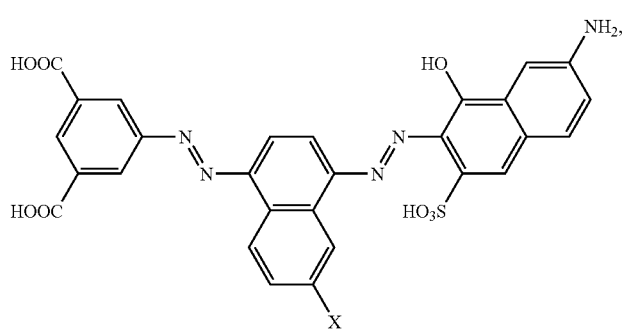

Formula I

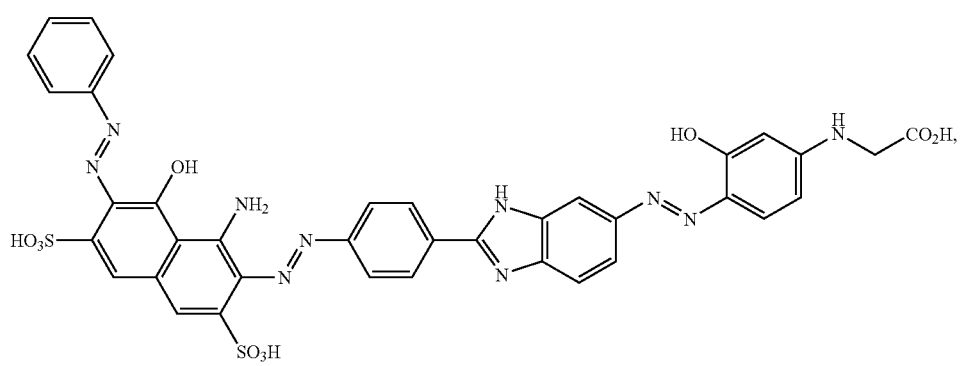

Formula II

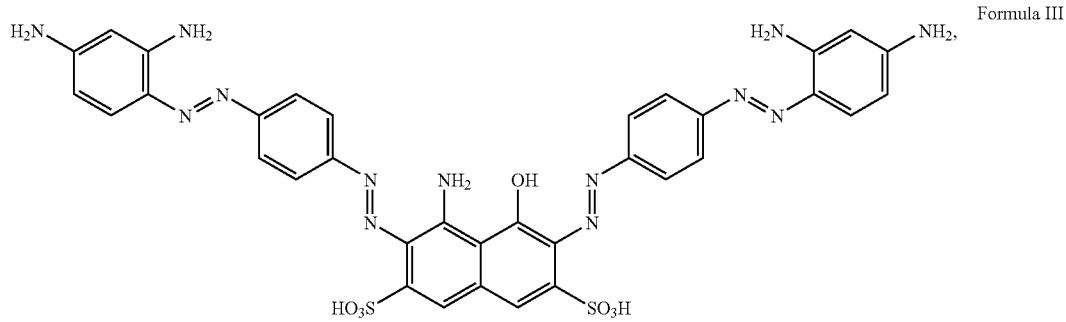

Formula III

-continued
Formula IV
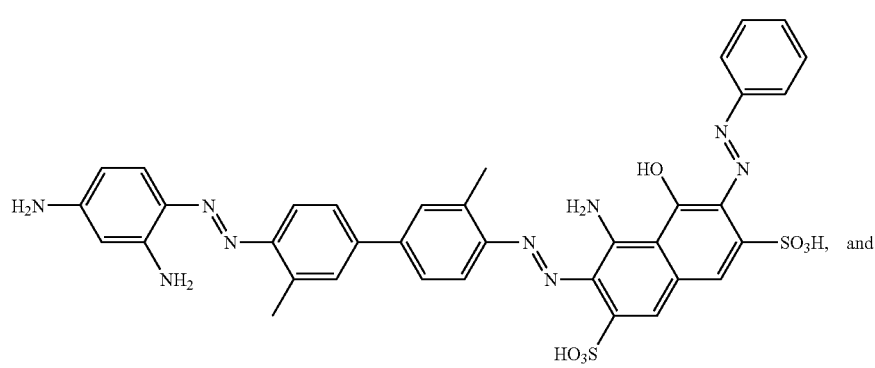
Formula V
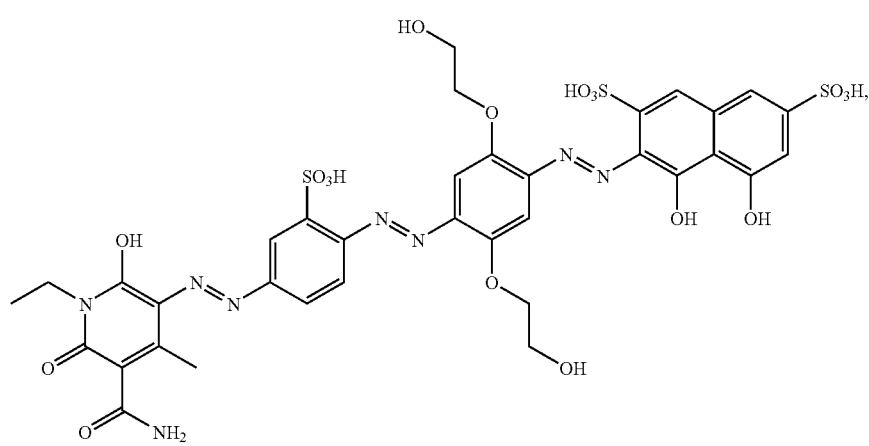
wherein X is H or SO₃H.
8. The ink-jet ink set of claim 6, wherein the first dye is a magenta dye selected from the group consisting of:
Formula VI
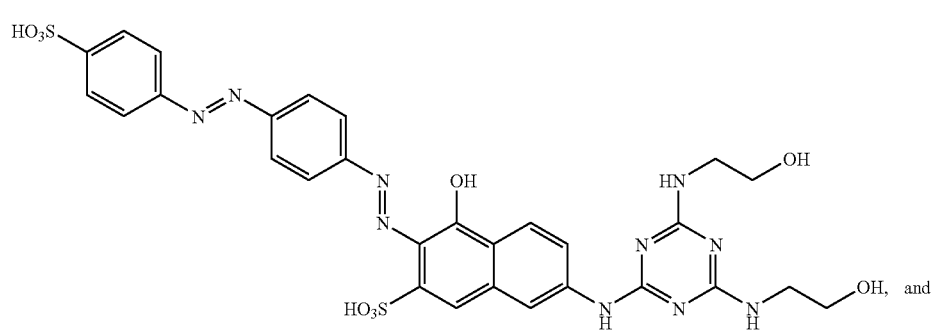
Formula VII
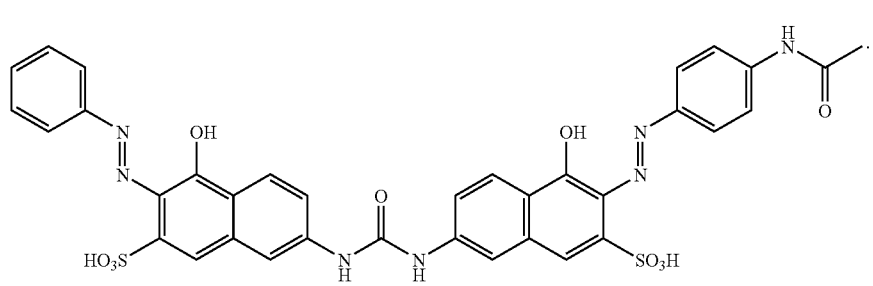

9. The ink-jet ink set of claim 6, wherein the second dye is a yellow dye selected from the group consisting of:

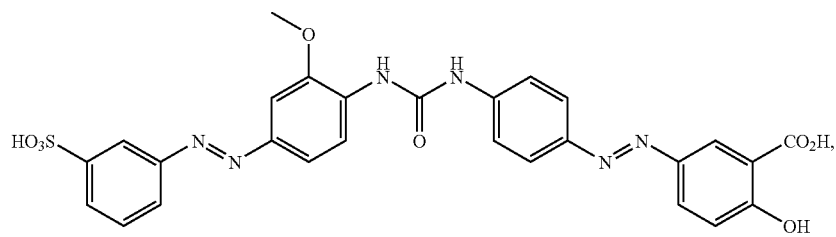

Formula VIII

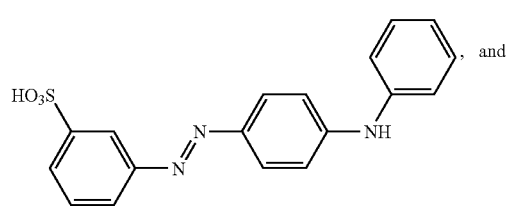

Formula IX

, and

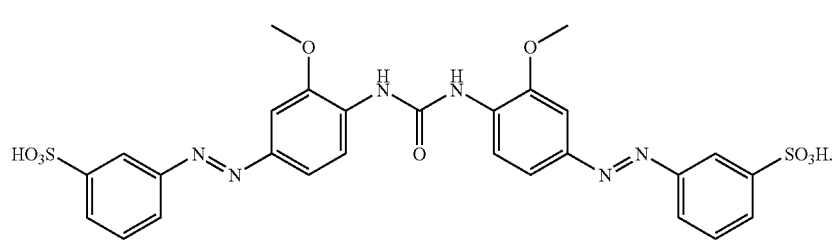

Formula X

10. The ink-jet ink set of claim 5, wherein each of the first dye and the second dye is a respective sulfonated non-metalized azo dye with a $SO_3H$ molecular weight percent of from 15 to 27%.

11. The ink-jet ink set of claim 5, wherein each of the first dye and the second dye is a respective sulfonated non-metalized azo dye with a $SO_3H$ molecular weight percent of from 18 to 27%.

12. The ink-jet ink set of claim 1, wherein at least the first dye is a sulfonated non-metalized azo dye with a $SO_3H$ molecular weight percent of from 15 to 27%.

13. The ink-jet ink set of claim 1, wherein at least the first dye is a sulfonated non-metalized azo dye with a $SO_3H$ molecular weight percent of from 18 to 27%.

14. The ink-jet ink set of claim 1,
wherein said first or second ink further comprises a cyan dye that is waterfast when disposed on said print medium.

15. A printer system, comprising:
a dispensing system including a paper substrate and at least one printhead,
wherein the paper substrate includes a multivalent salt associated with the paper substrate, wherein the multivalent salt comprises a metal selected from the group consisting of Group II metals, Group III metals, and multivalent transition metals, and
wherein the printhead includes an ink-jet ink set comprising:
a first ink and a second ink, wherein the first ink and the second ink are different dye colors, wherein each of the first ink and the second ink include at least a first respective sulfonated non-metalized azo dye with a $SO_3H$ molecular weight percent of from about 10 to 27%, wherein said first dye is capable of complexinq with said multivalent salt associated with said paper substrate when said inks are deposited on a said paper substrate with associated multivalent salt, and
wherein said first and second inks have enhanced waterfastness when disposed on the paper substrate containing said multivalent salt, compared to a paper substrate without said multivalent salt.

16. The printer system of claim 15, wherein at least one said ink further comprises a second sulfonated non-metalized azo dye with a $SO_3H$ molecular weight percent of from 10 to 27%.

17. The printer system of claim 15, wherein one of the first and second inks is black and comprises a sulfonated non-metalized azo dye selected from the group consisting of:

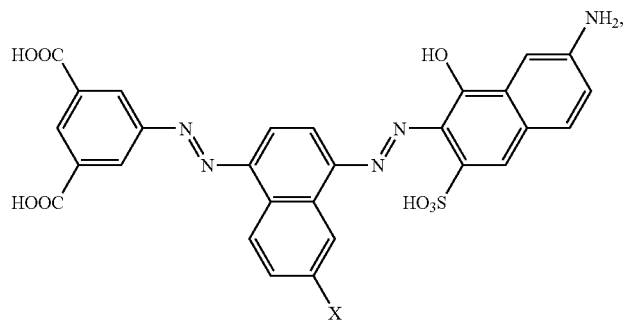
Formula I
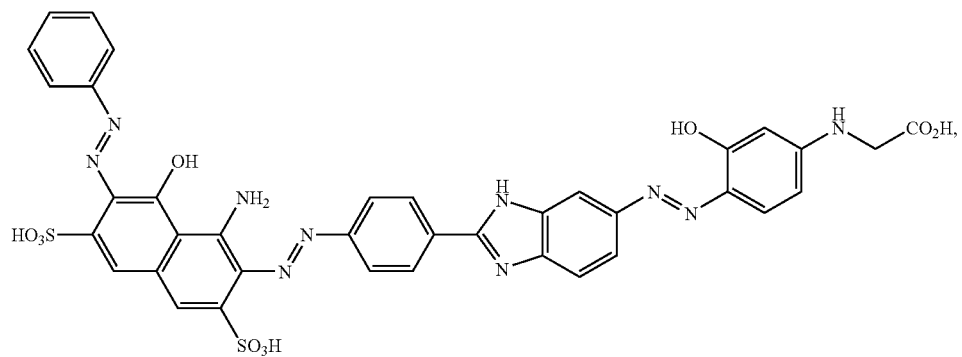
Formula II
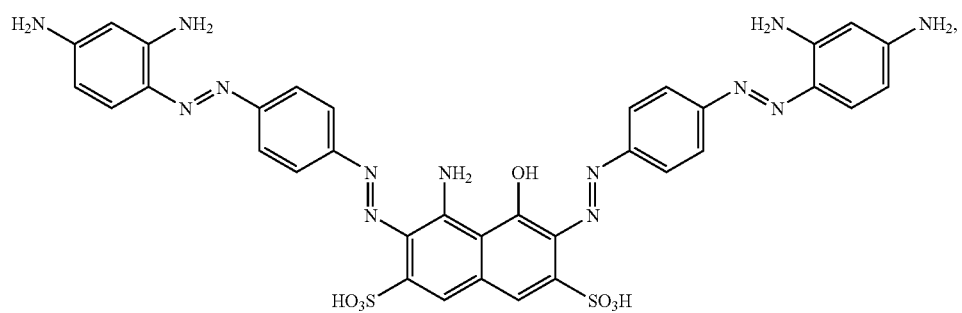
Formula III
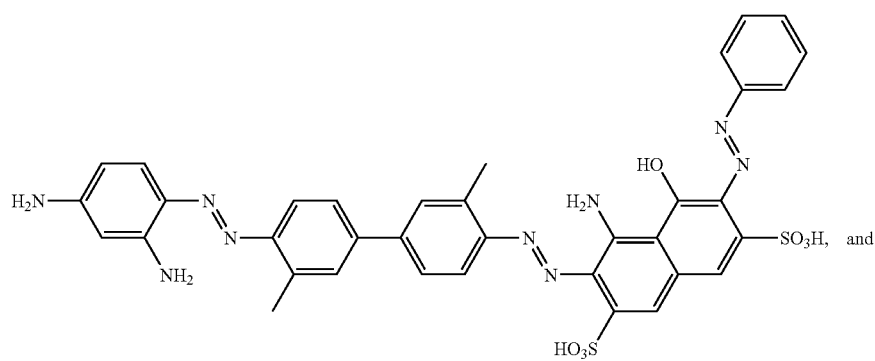
Formula IV

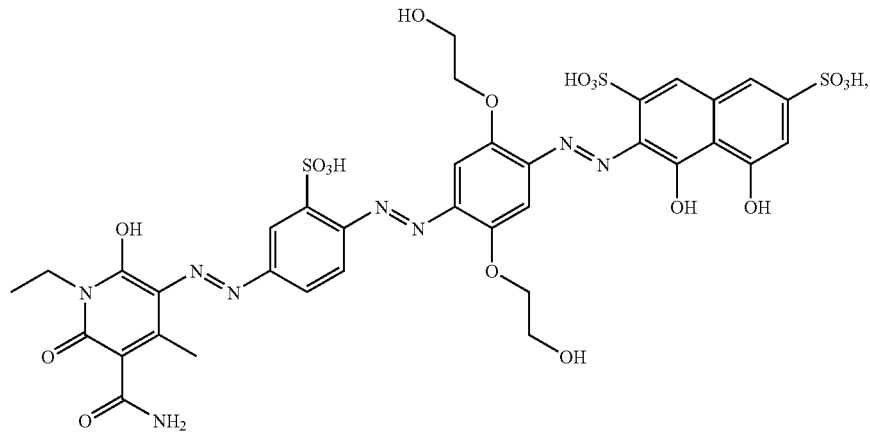
wherein X is H or SO₃H.
18. The printer system of claim 15, wherein one of the first and second inks is magenta and comprises a sulfonated non-metallized azo dye selected from the group consisting of:
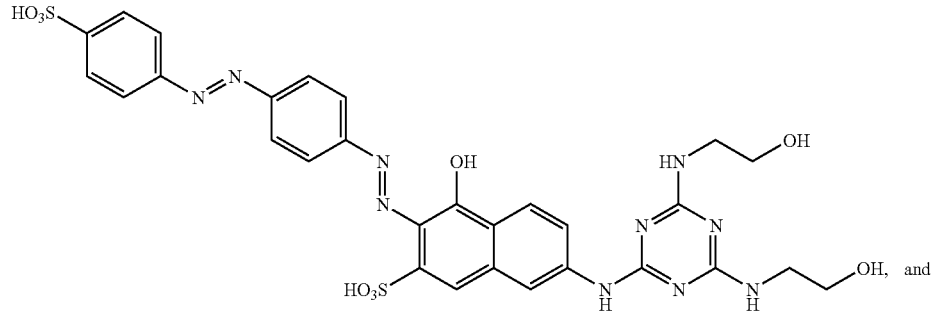
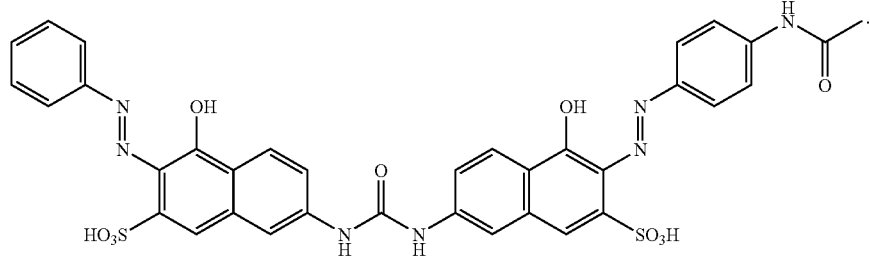
19. The printer system of claim 15, wherein one of the first and second inks is yellow and comprises a sulfonated non-metallized azo dye selected from the group consisting of:
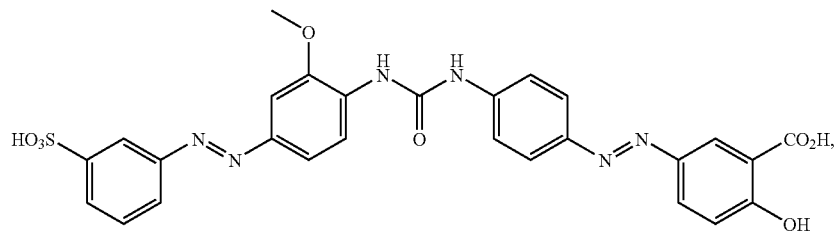

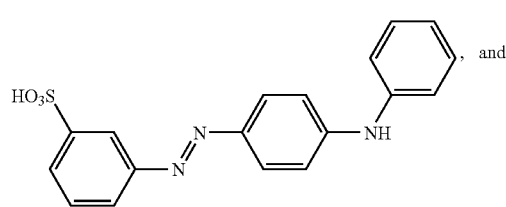
, and

Formula IX

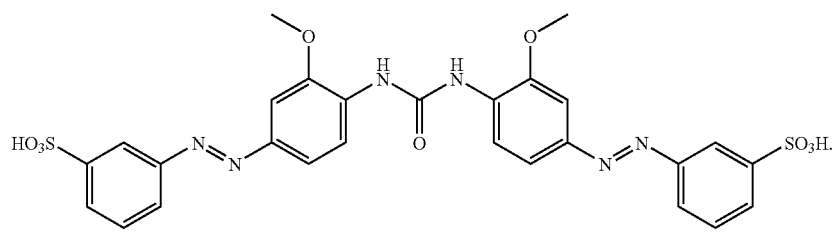

Formula X

20. The printer system of claim 15, wherein said first or second ink further comprises a cyan dye that is waterfast when deposited on said print medium.

21. The printer system of claim 15, wherein the multivalent salt includes a metal selected from the group consisting of calcium, magnesium, copper, nickel, zinc, barium, iron, aluminum, and chromium.

22. A printing material, comprising:
a print medium that includes a multivalent salt associated with a paper substrate, wherein the multivalent salt comprises a metal selected from the group consisting of Group II metals, Group III metals, and multivalent transition metals; and
a first ink and a second ink, wherein the first ink and the second ink are different dye colors, wherein each of the first ink and the second ink include at least a first respective sulfonated non-metalized azo dye with a $SO_3H$ molecular weight percent of from about 10 to 27%, wherein said first dye is capable of complexinq with a multivalent salt associated with a paper substrate when said inks are deposited on said print medium containing said paper substrate with associated multivalent salt, and
wherein the first ink and the second ink are disposed on the print medium and said sulfonated non-metalized azo dyes are complexed with said multivalent salt to decrease solubility of said deposited dyes, compared to a print medium without said multivalent salt.

23. The printing material of claim 22, wherein at least one said ink further comprises a second sulfonated non-metalized azo dye with a $SO_3H$ molecular weight percent of from 10 to 27%.

24. The printing material of claim 22, wherein the first dye is a black dye selected from the group consisting of:

Formula I

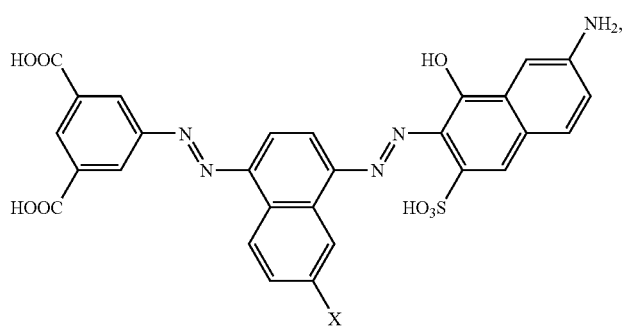

Formula II

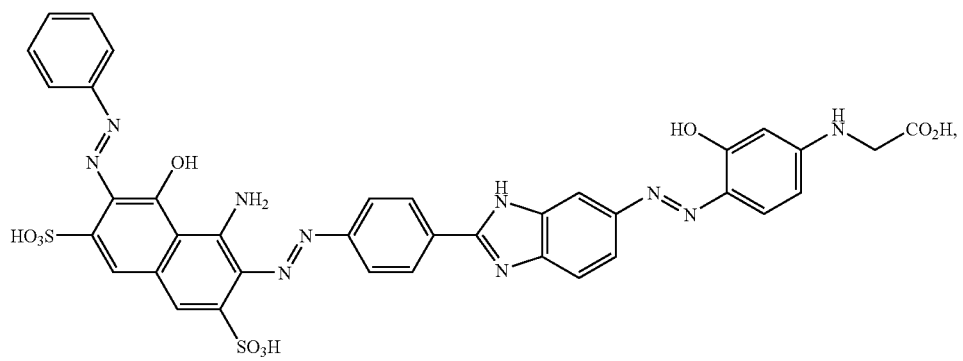

-continued
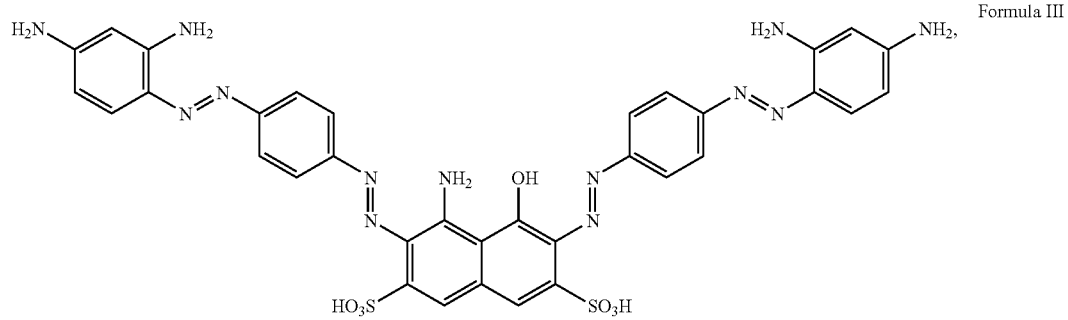
Formula III
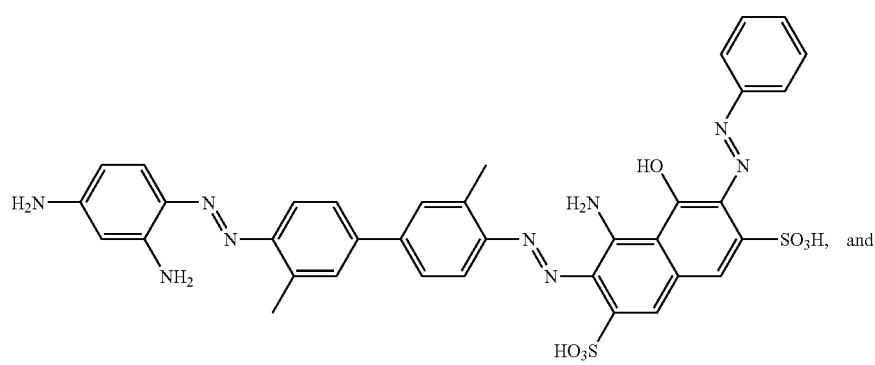
Formula IV
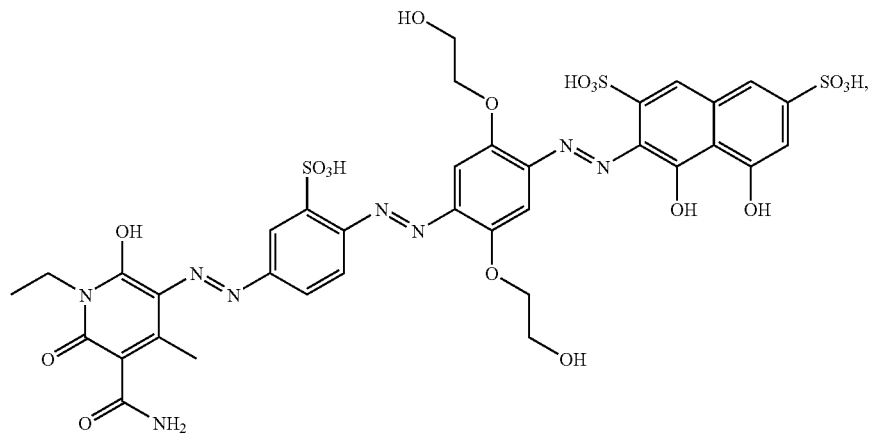
Formula V
wherein X is H or SO₃H.
25. The printing material of claim 22, wherein the first sulfonated non-metalized azo dye is a magenta dye selected from the group consisting of:
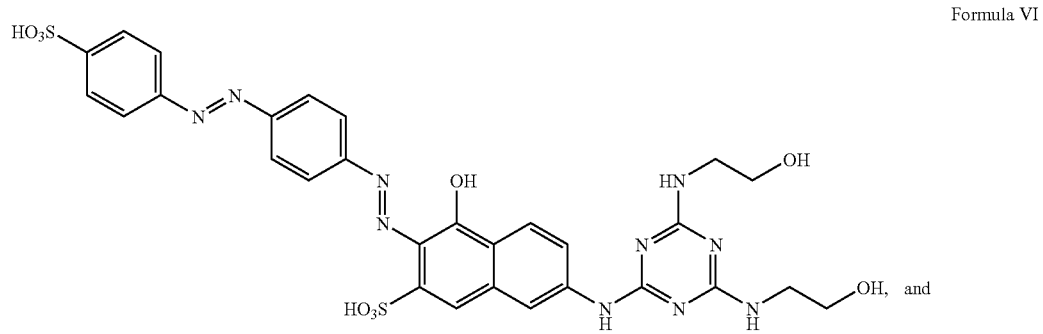
Formula VI -continued

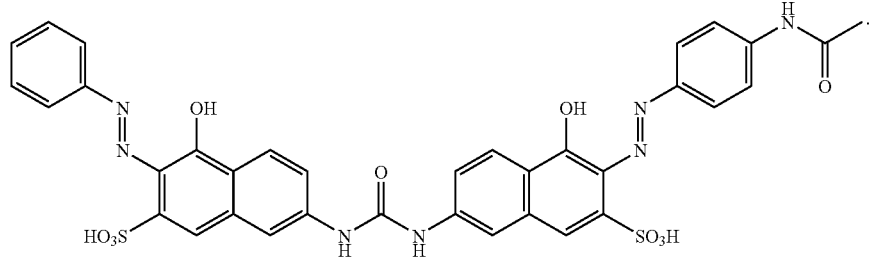

Formula VII

26. The printing material of claim 22, wherein the first sulfonated non-metalized azo dye is a yellow dye selected from the group consisting of:

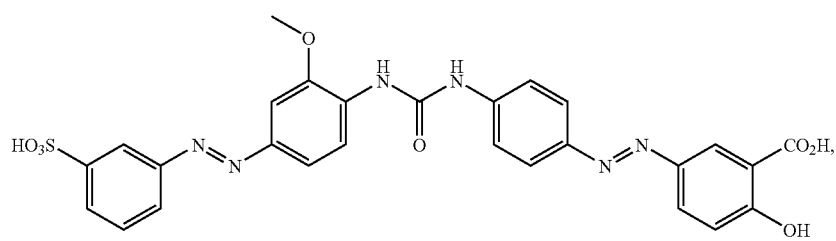

Formula VIII

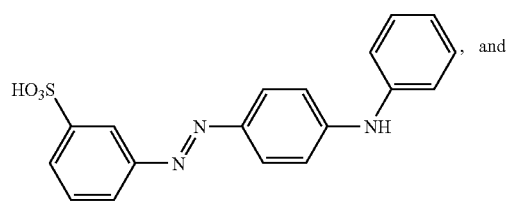

, and

Formula IX

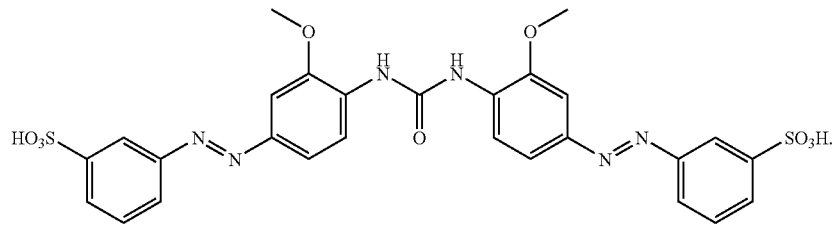

Formula X

27. The printing material of claim 22, wherein said first or second ink further comprises a waterfast cyan dye disposed on said print medium.

28. The printing material of claim 22, wherein the multivalent salt includes a metal selected from the group consisting of calcium, magnesium, copper, nickel, zinc, barium, iron, aluminum, and chromium.

29. A method of printing, comprising:
providing a print medium that includes a multivalent salt associated with a paper substrate, wherein the multivalent salt comprises a metal selected from the group consisting of Group II metals, Group III metals, and multivalent transition metals;
providing a first ink and a second ink, wherein the first ink and the second ink are different dye colors, wherein each of the first ink and the second ink include at least a first respective sulfonated non-metalized azo dye with a $SO_3H$ molecular weight percent of from about 10 to 27%, wherein said first dye is capable of complexing with said multivalent salt associated with said paper substrate when said inks are deposited on said print medium;
depositing the first ink and the second ink on the print medium, and causing said sulfonated non-metalized azo dyes to complex with said multivalent salt to decrease solubility of said dyes, to provide a printing material with improved waterfastness, compared to a printed medium without said multivalent salt.

30. The method of printing of claim 29, wherein one of said first and second inks further comprises a second sulfonated non-metalized azo dye with a $SO_3H$ molecular weight percent of from 10 to 27%.

31. The method of printing of claim 29, wherein the first dye is a black dye selected from the group consisting of:

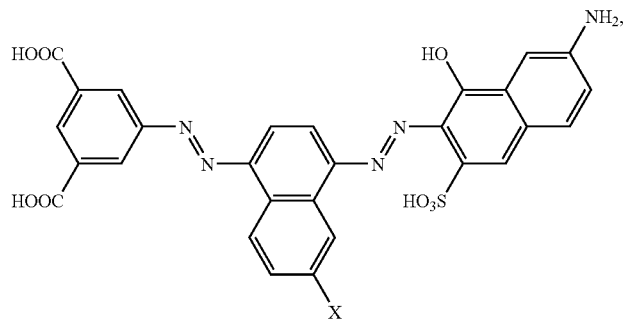
Formula I
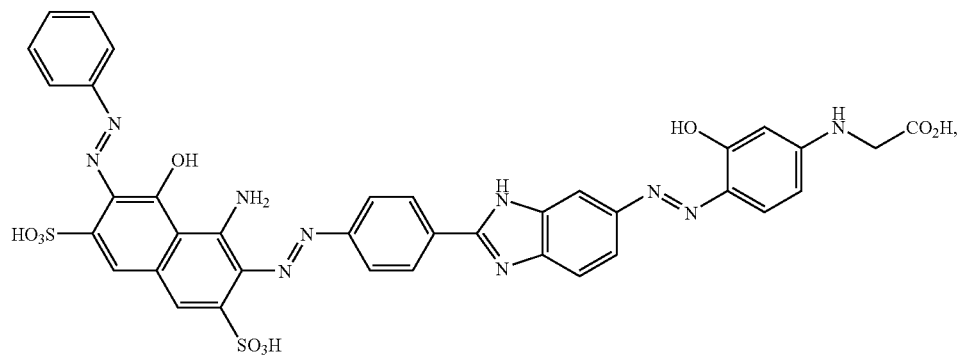
Formula II
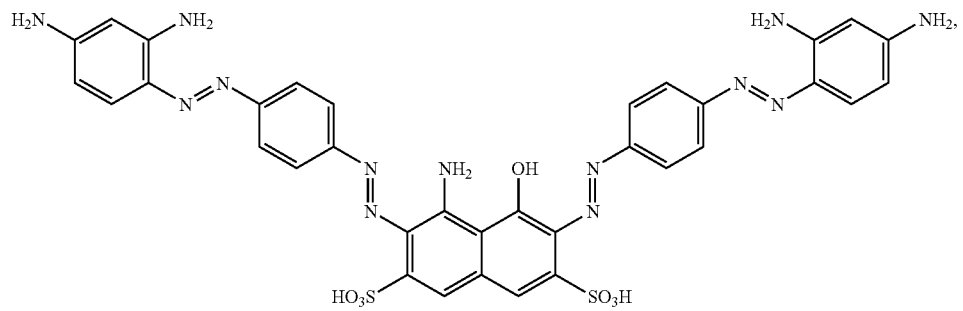
Formula III
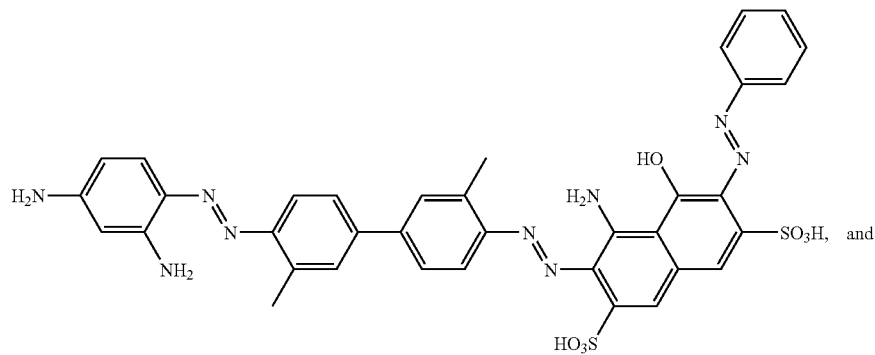
Formula IV

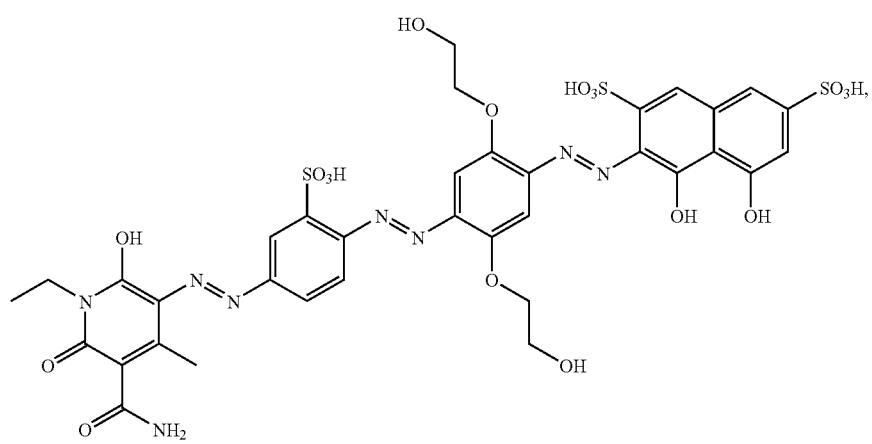
Formula V
wherein X is H or SO$_3$H.
32. The method of printing of claim 29, wherein the first dye is a magenta dye selected from the group consisting of:
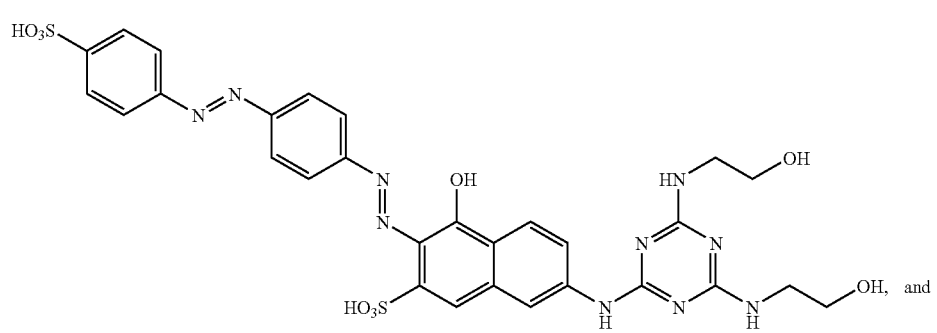
Formula VI
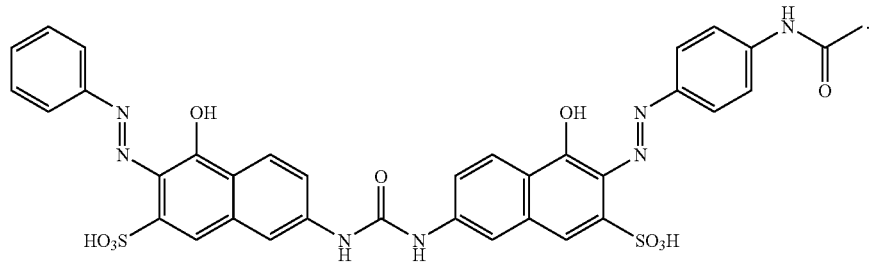
Formula VII
33. The method of printing of claim 29, wherein the first dye is a yellow dye selected from the group consisting of:
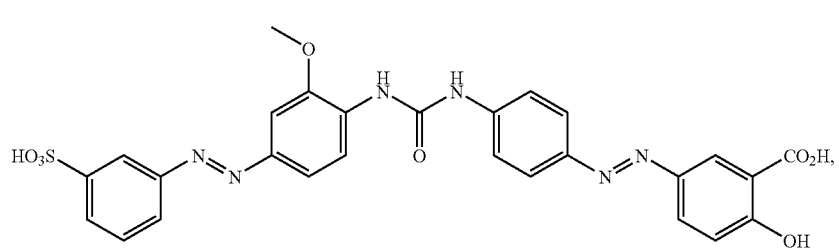
Formula VIII Formula IX
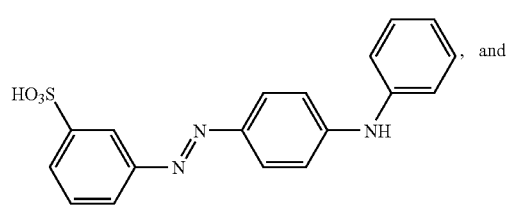
Formula X
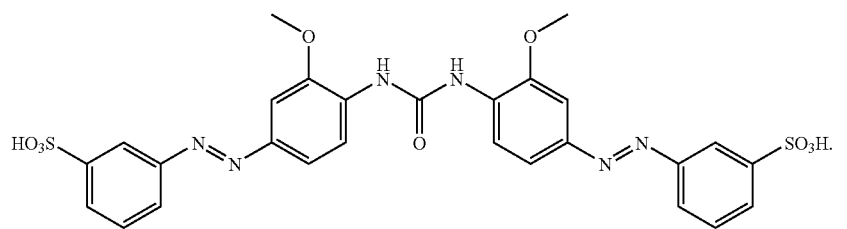
34. The method of printing of claim 29, wherein said first or second ink further comprises a cyan dye that is waterfast on said printing medium.
35. The method of printing of claim 29, wherein the multivalent salt includes a metal selected from the group consisting of calcium, magnesium, copper, nickel, zinc, barium, iron, aluminum, and chromium.
* * * * *

UNITED STATES PATENT AND TRADEMARK OFFICE
CERTIFICATE OF CORRECTION

| | | |
|---|---|---|
| PATENT NO. | : 7,833,335 B2 | Page 1 of 1 |
| APPLICATION NO. | : 11/786706 | |
| DATED | : November 16, 2010 | |
| INVENTOR(S) | : Matthew Thornberry et al. | |

It is certified that error appears in the above-identified patent and that said Letters Patent is hereby corrected as shown below:

In column 10, line 22, in Claim 6, delete "dye," and insert -- dye --, therefor.

In column 14, line 50, in Claim 15, delete "complexinq" and insert -- complexing --, therefor.

In column 20, line 23, in Claim 22, delete "complexinq" and insert -- complexing --, therefor.

Signed and Sealed this
Nineteenth Day of July, 2011

David J. Kappos
*Director of the United States Patent and Trademark Office*